Nov. 16, 1971   D. E. CORNELL III   3,619,988
FILTERING AND MOISTURE CONTROL DEVICE
Filed Feb. 14, 1969

INVENTOR.
DUDLEY E CORNELL III
BY Alberto, Brezina + Lund
Attys

# United States Patent Office 3,619,988
Patented Nov. 16, 1971

3,619,988
FILTERING AND MOISTURE CONTROL DEVICE
Dudley E. Cornell III, 221 San Pedro NE.,
Albuquerque, N. Mex. 87108
Filed Feb. 14, 1969, Ser. No. 799,193
Int. Cl. B01d 47/00
U.S. Cl. 55—234                              11 Claims

ABSTRACT OF THE DISCLOSURE

Device for filtering air and control of moisture therein, preferably by humidifying the air. The device is adapted to be supported over the head portion of a bed and includes a blower mounted in a housing. Air from the outlet of the blower flows into an enlongated chamber extending horizontally in a direction transverse to the length of the bed with a combination filtering and evaporating member of porous material forming one wall of the chamber and having a lower portion in a water pan in the lower portion of the chamber and with flexible transparent sheet forming triangular side walls and a top wall extending angularly downwardly to define a conduit extending toward a sleeper's head. A micron filter is preferably provided in the conduit and is so positioned as to produce a laminar flow of the air.

---

This invention relates to a filtering and moisture-control device and more particularly to a device which produces a very gentle and non-turbulent flow of filtered air over the head of a person sleeping in a bed to minimize asthma and allergy problems and the like. The device also controls moisture, preferably by humidifying the air. The device is relatively simple and inexpensive in construction while being highly efficient in use.

This invention was evolved with the general object of providing a device to alleviate the problems of asthmatics and other allergy sufferers. A significant portion of allergic reactions in all of these cases is caused by house dust and pollens. The major period of exposure to both house dust and pollens occurs while the person is sleeping. The reason why pollen exposure takes place at this time is that a major percentage of pollens are released into the air during the night hours, more being released in the latter part of the night hours, between midnight and dawn, when the average person is sleeping. The average person, excluding housewives, is in some location other than the house most of the day and at least half of the time spent at home is spent in bed.

The device of this invention is relatively simple and inexpensive and can be readily installed adjacent the head portion of a bed, while requiring no tent over the bed, which might produce the feeling of being closed in. It substantially eliminates house dust and other allergents from the air a person breathes while sleeping and also controls moisture, preferably by increasing the humidity of the dry air to about 50 percent or higher. At the same time, the flow of filtered and moisture-controlled air from the device is very gentle and is not distracting.

In accordance with this invention, moisture-control means are provided communicating with the outlet of a blower and conduit means are provided for receiving air from the moisture-control means and for directing flow of air downwardly through a region of relatively large area located above and in generally facing relation to the head portion of a bed. With this arrangement, a gentle flow of the air is produced, so as not to distract or disturb the person sleeping on the bed.

The device of this invention was particularly designed for use in the dry arid climate of New Mexico and the moisture-control means preferably is in the form of humidifying means for adding moisture to the dry air. It will be understood, however, that the moisture-control means could be in the form of dehumidifying means for removing moisture. For example, with dehumidifying means, the device could be used in hot humid weather and would be especially valuable in the hayfever season.

In accordance with a specific feature of the invention, the device comprises a housing having an elongated chamber therewithin, extending horizontally and in generally transverse relation to the bed, the chamber being in communication with the blower outlet. The chamber has an outlet on the side facing the bed, from which air flows through the conduit means.

To provide humidifying means, a water pan is provided in the lower portion of the chamber and a member of a foam or other porous material is provided having a lower edge portion in the water pan, the member extending across the outlet opening of the chamber. With this arrangement, the member defines both a means for evaporation of the water and a means for filtering the air.

A very important feature of the invention relates to the production of laminar flow of air into the region of the sleeper's head, to obtain a gentle and undistracting flow of air without requiring the use of a tent or the like over the bed, which would be objectionable, among other things, in that it would create the feeling of being enclosed.

In accordance with a specific feature of the invention, the laminar flow of air is produced throughout a wide area, through the use of a filter member preferably a micron filter, which will remove very small particles from the air. The filter member preferably has a lower edge at a level of substantially below the lower end of the chamber which communicates with the outlet of the blower, and extends angularly upwardly and forwardly, i.e. toward the foot of the bed, the upper portion of the filter being positioned opposite the outlet from the chamber. With this feature the air from the chamber passes into a tapered chamber extending down the headboard of the bed. This arrangement accomplishes three things:

(1) Laminar flow air moving down the chamber is gradually constricted to provide a uniform distribution of air at right angles through the filter from top to bottom. If the chamber were not tapered, a high volume of air would exit from the bottom of the filter in turbulent flow. An ineffective laminar flow would exit from the top of the filter.

(2) The taper allows the unit to be used over the existing headboard of a bed without shortening the usable length of the bed.

(3) If the unit were not tapered, the effective area of humidified, filtered laminar flow air would not extend as far down over the sleeper's head. The area of clean air extending out from the filter area is roughly a pyramid with 45-degree sides angled inward from the base of the filter. If the filter were parallel with the headboard, the 45-degree side angling up from the bottom of the filter could very easily be above the nostrils of the person sleeping. By tapering the outlet area, the clean air is brought down over the person's head.

According to another feature of the invention, the conduit means includes a top wall extending angularly and toward the foot of the bed, the lower edge of the top wall being preferably connected to the bight portion of a U-shaped member having a pair of leg portions the ends of which are hingedly connected to the housing of the device. The conduit means preferably includes, also, a pair of triangularly shaped side walls integral with the top wall and having lower edges connected to the legs of the U-shaped member. The top and side walls are preferably of a flexible material to permit folding when the device is not in use or when it is moved from one place to another. In addition, the flexible material is preferably transparent.

This invention contemplates other objects, features and advantages which will become more fully apparent from the following detailed description taken in conjunction with the accompanying drawing which illustrates a preferred embodiment and in which.

Figure 1:
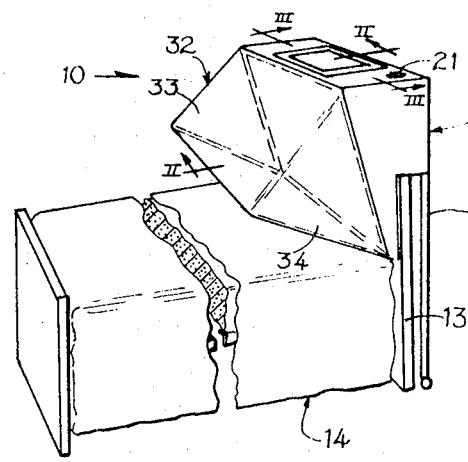
FIG. 1 is a perspective view of a filtering and moisture-control device constructed in accordance with the principles of this invention.
Figure 2:
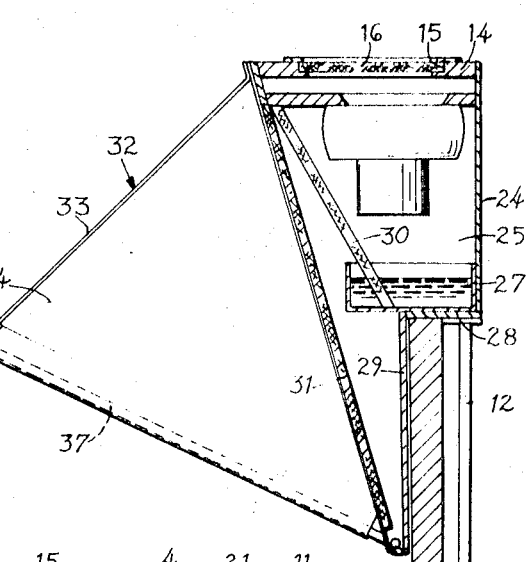
FIG. 2 is a sectional view taken substantially along line II—II of FIG. 1.
Figure 3:
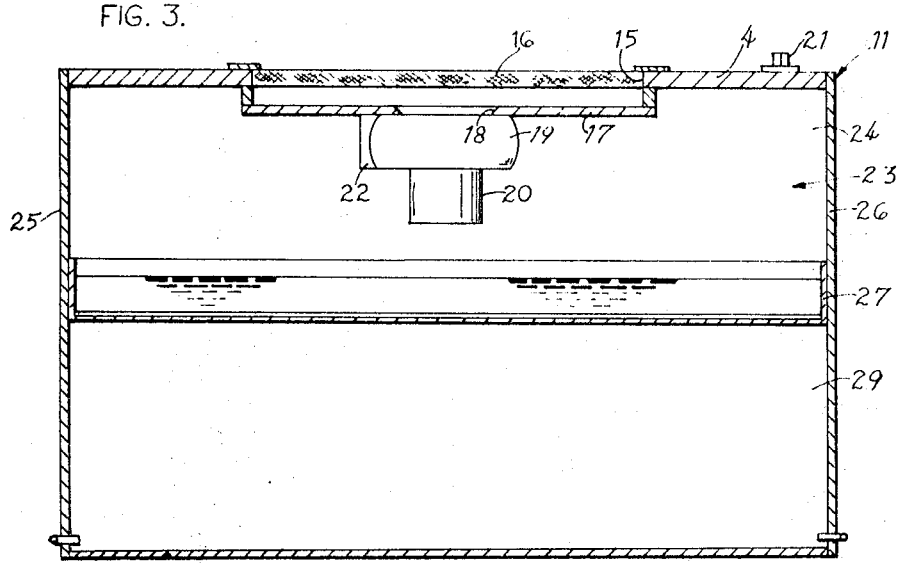
FIG. 3 is a sectional view taken substantially along line III—III of FIG. 2.

Reference 10 generally designates a moisture-control and filtering device constructed in accordance with the principles of this invention. The device 10 includes a housing 11 which is adapted to be supported adjacent the head portion of a bed. For this purpose, means may be provided for supporting the housing 11 on a wall and, if desired, legs 12 may be provided for supporting the device from the floor. Suitable support means may be provided to partially or completely support the housing 11 on the headboard 13 of a bed generally designated by reference 14.

The housing 11 includes a top wall 14 which has a central opening 15 within which a filter 16 is preferably disposed. A board 17 is supported below the opening 15 and has a central opening 18 aligned with the inlet of a blower 19, the blower 19 being supported from the underside of the headboard 17 and being driven by an electric motor 20 which may be connected to a suitable source of electrical current. A switch 21 may be provided on the top wall 14 for controlling energization of the motor 20. The blower 19 has an outlet 22 from which air flows into an elongated chamber 23. The chamber 23 is defined by the top wall 14 together with the board 17, a rear wall 24 of the housing, side walls 25 and 26 of the housing and a water pan 27 which is supported on a ledge 28 extending from the lower end of the rear wall 24. An additional rear wall 29 extends downwardly from the forward edge of the ledge 28. When the device is used with a bed having a headboard, the ledge 28 may rest on the headboard.

The forward end of the chamber 23 forms an outlet therefrom which is preferably closed by a member 30 of a foam or other porous material. The lower edge portion of the member 30 extends into water in the pan 27, so that the water will be evaporated from the member 30 as the air passes therethrough. The member 30 thus forms a combination filtering and humidifying means.

In accordance with another feature of the invention, an additional filter 31 is provided which may preferably be a micron filter to remove very small particles from the air such as pollen and the like. The filter 31 extends across the entire front of the device and is of a size such that its lower end is positioned at a level substantially below the level of the water pan 27. From the lower edge thereof, the filter 31 extends angularly upwardly and forwardly, i.e. toward the foot of the bed, the upper portion thereof being positioned opposite the first filter member 30. With this arrangement, a tapered chamber is provided which, as above described, produces laminar flow of air throughout a wide area with a uniform distribution.

In accordance with another feature of the invention, conduit means are provided, preferably including a member 32 of a flexible, transparent material such as a suitable plastic material, which defines a top wall 33 extending angularly downwardly and forwardly and a pair of triangularly shaped side walls 34. To hold the wall 33 and side walls 34 in position, a U-shaped member 35 is provided having a bight portion 36 connected to the lower end portion of the top wall 33 and having a pair of leg portions 37 connected to the lower end portions of the side walls 34, with the ends of the leg portions 37 being hingedly connected to the housing 11 adjacent to the lower end thereof.

The conduit formed by the member 33 and cooperating portions of the side walls 25 and 26 of the housing aids in insuring a general laminar flow of air downwardly and forwardly into the region of the sleeper's head.

It will be understood that modifications and variations may be effected without departing from the spirit and scope of the novel concepts of this invention.

I claim as my invention:

1. In a device for use with a bed, a housing adapted to be supported adjacent the head portion of a bed, a blower in said housing having an inlet and an outlet, means defining a chamber in said housing communicating with said blower outlet and having an outlet for passage of air therefrom, and conduit means for receiving air from said chamber outlet and for directing flow of air downwardly through a region of large area located above and in generally facing relation to said head portion of the bed, said chamber being an elongated chamber extending horizontally in a direction generally transverse to the length of the bed, an elongated water pan in the lower portion of said chamber, and a member of porous material having a lower edge portion in said water pan and forming one wall of said chamber to define a filter between said elongated chamber and said conduit means.

2. In a device as defined in claim 1, said conduit means being effective to produce laminar flow of the air.

3. In a device as defined in claim 2, filter means in said conduit means having an area greater than that of said chamber outlet and so positioned as to produce laminar flow from substantially the entire area of said filter means.

4. In a device as defined in claim 3, said filter means extending angularly upwardly and toward the foot of the bed from a point approximately in alignment with the head end of the bed with the upper portion of said filter means being positioned opposite said chamber outlet.

5. In a device as defined in claim 1, said conduit means including a top wall extending angularly downwardly and toward the foot of the bed.

6. In a device as defined in claim 5, said top wall being of a transparent material.

7. In a device as defined in claim 5, said top wall being of a flexible material, and a U-shaped member including a bight portion connected to the lower edge of said top wall and including a pair of leg portions having ends hingedly connected to said housing.

8. In a device as defined in claim 7, said conduit means further including a pair of triangularly shaped side walls of flexible material integral with said top wall and having lower edges connected to said leg portions of said U-shaped member.

9. In a device as defined in claim 1, an additional filter in said conduit means.

10. In a device as defined in claim 9, said additional filter having an upper portion aligned with said member of porous material and having a lower portion extending downwardly below the level of said water pan.

11. In a device as defined in claim 1, said housing including a top wall having a central opening aligned with said blower inlet, and a filter in said central opening.

References Cited

UNITED STATES PATENTS

| | | | |
|---|---|---|---|
| 839,688 | 12/1906 | Williams | 98—89 |
| 849,611 | 4/1907 | Hofer | 98—89 |
| 986,430 | 3/1911 | Berchem | 98—89 |
| 1,451,329 | 4/1923 | Dressler | 261—99 |
| 2,358,868 | 9/1944 | Marx | 55 A.C. |
| 2,566,366 | 9/1951 | Pennington | 261—107 X |
| 2,620,722 | 12/1952 | Owens | 55—259 X |
| 3,464,188 | 9/1969 | Keuls | 55—259 X |

FOREIGN PATENTS 1,448,873   7/1966   France.

TIM R. MILES, Primary Examiner

S. H. Markowitz, Assistant Examiner

U.S. Cl. X.R.

55—257; 98—89; 261—99, 107